United States Patent
Bae et al.

(10) Patent No.: US 9,876,441 B2
(45) Date of Patent: Jan. 23, 2018

(54) CONTROL POWER SUPPLY DEVICE FOR INVERTER

(71) Applicant: LSIS CO., LTD., Gyeonggi-do (KR)

(72) Inventors: Tae-Suk Bae, Gyeonggi-do (KR); Chun-Suk Yang, Gyeonggi-do (KR)

(73) Assignee: LSIS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/169,127

(22) Filed: May 31, 2016

(65) Prior Publication Data

US 2016/0359428 A1  Dec. 8, 2016

(30) Foreign Application Priority Data

Jun. 2, 2015 (KR) .................. 10-2015-0077695

(51) Int. Cl.
*H02P 3/02* (2006.01)
*H02M 7/537* (2006.01)
(Continued)

(52) U.S. Cl.
CPC ............ *H02M 7/537* (2013.01); *H02J 1/00* (2013.01); *H02J 9/02* (2013.01); *H02J 9/06* (2013.01); *H02M 1/00* (2013.01); *H02M 1/08* (2013.01); *H02M 7/48* (2013.01); *H02M 2001/0006* (2013.01); *H02M 2001/325* (2013.01)

(58) Field of Classification Search
CPC ............... H02M 7/537; H02M 7/48; H02M 2001/0006; H02M 2001/325; H02P 23/00; B60L 11/1868

USPC .............. 318/139, 442, 766, 810; 307/10.6, 307/10.764, 66; 363/16–17, 89, 71–73
See application file for complete search history.

(56) References Cited

U.S. PATENT DOCUMENTS 5,315,533 A * 5/1994 Stich .................. H02J 9/062
307/66
5,602,462 A * 2/1997 Stich .................. G05F 1/147
307/64
(Continued)

FOREIGN PATENT DOCUMENTS

EP   2806519 A1   11/2014
JP   S5847918 U   3/1983
(Continued)

OTHER PUBLICATIONS

European Search Report dated Mar. 17, 2017 corresponding to application No. 16169363.5-1809.
(Continued)

*Primary Examiner* — Rajnikant Patel
(74) *Attorney, Agent, or Firm* — Nath, Goldberg & Meyer; Jerald L. Meyer; Leonid D. Thenor

(57) ABSTRACT

In some embodiments, a control power supply device for an inverter may include a main switched-mode power supply (SMPS) for supplying rated voltages to a controller and an auxiliary circuit of the inverter, an auxiliary SMPS configured to be operated when the main SMPS is interrupted to supply the rated voltages to the controller and the auxiliary circuit of the inverter; and an SMPS controller configured to sense an output voltage from the main SMPS, determine whether the sensed voltage is within a normal range and interrupt the main SMPS and operate the auxiliary SMPS if not, and transmit trip information to the controller.

10 Claims, 3 Drawing Sheets

(51) Int. Cl.
*H02M 1/00* (2006.01)
*H02M 1/08* (2006.01)
*H02J 1/00* (2006.01)
*H02M 7/48* (2007.01)
*H02J 9/02* (2006.01)
*H02J 9/06* (2006.01)
*H02M 1/32* (2007.01)

(56) References Cited

U.S. PATENT DOCUMENTS

| | | | | |
|---|---|---|---|---|
| 5,777,450 | A * | 7/1998 | Kono | G05B 19/406 318/568.11 |
| 7,976,284 | B2 * | 7/2011 | Koehl | F04D 15/0088 417/42 |
| 8,330,381 | B2 * | 12/2012 | Langovsky | H05B 33/0809 315/200 R |
| 8,789,659 | B2 * | 7/2014 | Agirman | B66B 1/302 187/290 |
| 9,112,437 | B2 * | 8/2015 | Kim | H02P 3/02 |
| 9,309,887 | B2 * | 4/2016 | Maass | F04C 28/00 |
| 9,571,014 | B2 * | 2/2017 | Mahdavi | H02J 1/10 |
| 2006/0259202 | A1 | 11/2006 | Vaish | |
| 2015/0062992 | A1 | 3/2015 | Park | |

FOREIGN PATENT DOCUMENTS

| | | |
|---|---|---|
| JP | S6387193 A | 4/1988 |
| JP | H0538077 A | 2/1993 |
| JP | H06178447 A | 6/1994 |
| JP | H06351258 A | 12/1994 |
| JP | H09288531 A | 11/1997 |
| JP | 2004015881 A | 1/2004 |
| JP | 2008067559 A | 3/2008 |
| JP | 2011008642 A | 1/2011 |
| JP | 201205414 A | 5/2012 |
| KR | 10-2001-0073796 A | 8/2001 |
| KR | 10-2011-0047602 A | 5/2011 |
| KR | 10-2014-0074866 A | 6/2014 |
| KR | 10-2015-0025347 A | 3/2015 |
| WO | 2014166537 A1 | 10/2014 |

OTHER PUBLICATIONS

Japanese office action dated Aug. 29, 2017 for corresponding JP application.

* cited by examiner

CONTROL POWER SUPPLY DEVICE FOR INVERTER

CROSS REFERENCE TO RELATED APPLICATIONS

This application claims the benefit of Korean Patent Application No. 10-2015-0077695, filed on Jun. 2, 2015, which is hereby incorporated by reference in its entirety.

BACKGROUND

1. Technical Field

The present disclosure relates to a control power supply device for an inverter. More particularly, the present disclosure relates to a control power supply device for an inverter, which senses an output voltage of a main switched-mode power supply (SMPS) for supplying stable power to the inverter, and, if the sensed voltage is not in a normal range, interrupts an operation of the main SMPS to operate an auxiliary SMPS, and transmits trip information to a controller for controlling the inverter.

2. Description of the Related Art

An inverter is a power conversion device that converts AC mains electricity to a DC voltage and then again converts the DC voltage to an AC voltage, thereby freely controlling an electric motor.

Inverters find a variety of applications in the overall industry, including fans, pumps, elevators, transfer devices, production lines, and the like. Typically, an inverter for driving motors converts power in such a manner that it receives and converts three-phase AC mains electricity to a DC voltage using a rectifier circuit, stores the DC voltage in a capacitor of a DC-link, and then converts the DC voltage to an AC voltage using an inverter unit.

An inverter is a variable voltage variable frequency (VVVF) system, whose voltage and frequency input to an AC motor can vary depending on a pulse width modulation (PWM) output, thereby controlling the speed of the motor.

Typically, inverters or converters as power conversion devices essentially includes auxiliary circuits for performing functions including communications, protection, control, and the like, as well as a circuit for performing a main function. Such auxiliary circuits require the respective stable rated voltages to be supplied thereto. To this end, a switched-mode power supply (SMPS) is employed. If a problem occurs in an operation of the SMPS, it also affects the main function of the inverter. Hence, the SMPS is an especially important component among others.

The SMPS is a very important circuit that supplies power to a controller for controlling the overall operations of the inverter and other main functional circuits. If a problem occurs in the stable power supply of the SMPS, functions of the controller and the main functional circuits are interrupted, which actually results in interruption of the overall functions of the inverter. In existing inverters, an SMPS is a sole component as a main circuit of the inverter and thus is highly risky and the inverter is not highly reliable.

In practice, from analysis results of the field claims on the existing products, it can be seen that the failure that the SMPS does not work appears at high rate.

SUMMARY

It is an aspect of some embodiments of the present disclosure to provide a control power supply device for an inverter, which senses an output voltage of a main switched-mode power supply (SMPS) for supplying stable power to the inverter, and, if the sensed voltage is not in a normal range, interrupts an operation of the main SMPS to operate an auxiliary SMPS, and transmits trip information to a controller for controlling the inverter.

It should be noted that embodiments of the present disclosure are not limited to those described above and other embodiments of the present disclosure will be apparent to those skilled in the art from the following descriptions.

In accordance with one aspect of some embodiments of the present disclosure, a control power supply device for an inverter includes a main switched-mode power supply (SMPS) configured to supply rated voltages to a controller and an auxiliary circuit of the inverter; an auxiliary SMPS configured to be operated when the main SMPS is interrupted to supply the rated voltages to the controller and the auxiliary circuit of the inverter; and an SMPS controller configured to sense an output voltage from the main SMPS, determine whether the sensed voltage is within a normal range and interrupt the main SMPS and operate the auxiliary SMPS if not, and transmit trip information to the controller.

The SMPS controller may store a main SMPS fault history in a memory when the sensed voltage is not within the normal range.

The SMPS controller, upon being powered, may determine whether there is a main SMPS fault history stored in the memory, interrupt the main SMPS and operate the auxiliary SMPS if so, and transmit the tip information to the controller.

The SMPS controller may sense an output voltage from the main SMPS when a DC-link voltage of the inverter is greater than a set voltage at the time of turning on or off the inverter, and determine whether the sensed voltage is in the normal range.

The set voltage level may be an operating voltage of the main SMPS plus a margin voltage.

The control power supply device may further include a down converter configured to step down a voltage from a DC-link of the inverter and output it to the SMPS controller.

The main SMPS and the auxiliary SMPS may be supplied with an operated voltage from the DC-link of the inverter.

The controller may indicate the trip information received from the SMPS controller to a user.

A first mode may be performed in which the SMPS controller transmits the trip information to the controller and the auxiliary SMPS supplies a voltage only to the controller.

A second mode may be performed in which the SMPS controller transmits the trip information to the controller and the auxiliary SMPS supplies the controller and the auxiliary circuit with a minimum power including a gate drive power for restarting the inverter and an I/O power.

A third mode may be performed in which the SMPS controller transmits the trip information to the controller and the auxiliary SMPS supplies the controller and the auxiliary circuit with a maximum voltage including a gate drive power for restarting the inverter and an I/O power, and power for communications and fan control.

DETAILED DESCRIPTION

Embodiments of the present disclosure will now be described in detail with reference to the accompanying drawings. However, it should be noted that the spirit of the present disclosure is not limited to the embodiments set forth herein and those skilled in the art will understand that the present disclosure could easily accomplish retrogressive disclosures or other embodiments included in the spirit of the present disclosure by the addition, modification, and removal of components within the spirit construed as being included in the spirit of the present disclosure.

Terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way.

That is, in the following description, the term "include(s)" may not exclude other components or steps.

Figure 1:
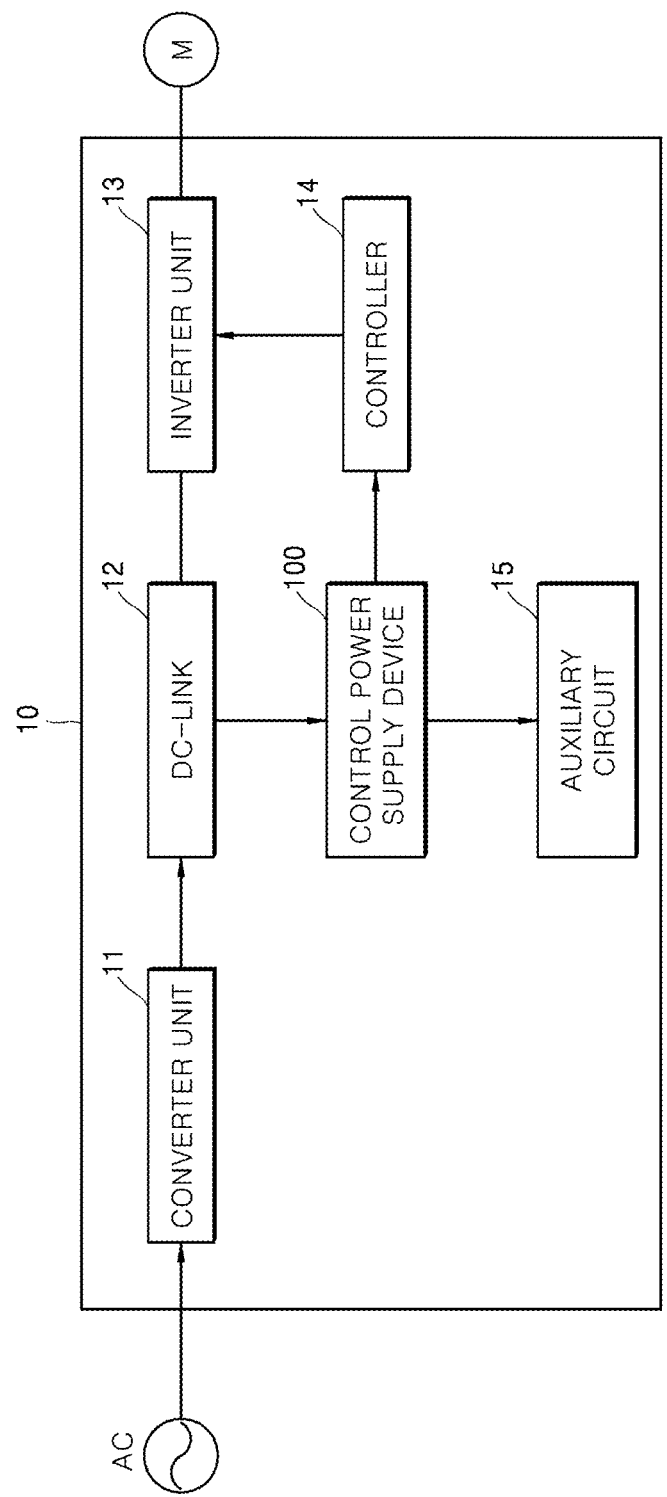
FIG. 1 is a diagram illustrating a control power supply device for an inverter according to an embodiment of the present disclosure.

FIG. 1 is a diagram illustrating a control power supply device for an inverter according to an embodiment of the present disclosure.

Referring to FIG. 1, the control power supply device 100 according to the embodiment of the present disclosure may be included in the inverter 10. The inverter 10 may further include a converter unit 11, a DC-link 12, an inverter unit 13, a controller 14, and an auxiliary circuit 15.

The converter unit 11 receives three-phase AC mains electricity and converts it into a DC voltage using a rectifier circuit. The DC-link 12 stores the DC voltage converted by the converter unit 11 in a capacitor. The inverter unit 13 converts the DC voltage stored in the DC-link into an AC voltage, thereby driving a motor M. The controller 14 controls an operation of the inverter unit 13. The auxiliary circuit 15 may be disposed to perform an auxiliary operation in the inverter 10.

The control power supply device 100 consists of a main switched-mode power supply (SMPS) and an auxiliary SMPS and may regulate voltages to the controller 14 and the auxiliary circuit 15 so that rated voltages are supplied to the controller 14 and the auxiliary circuit 15, respectively.

Figure 2:
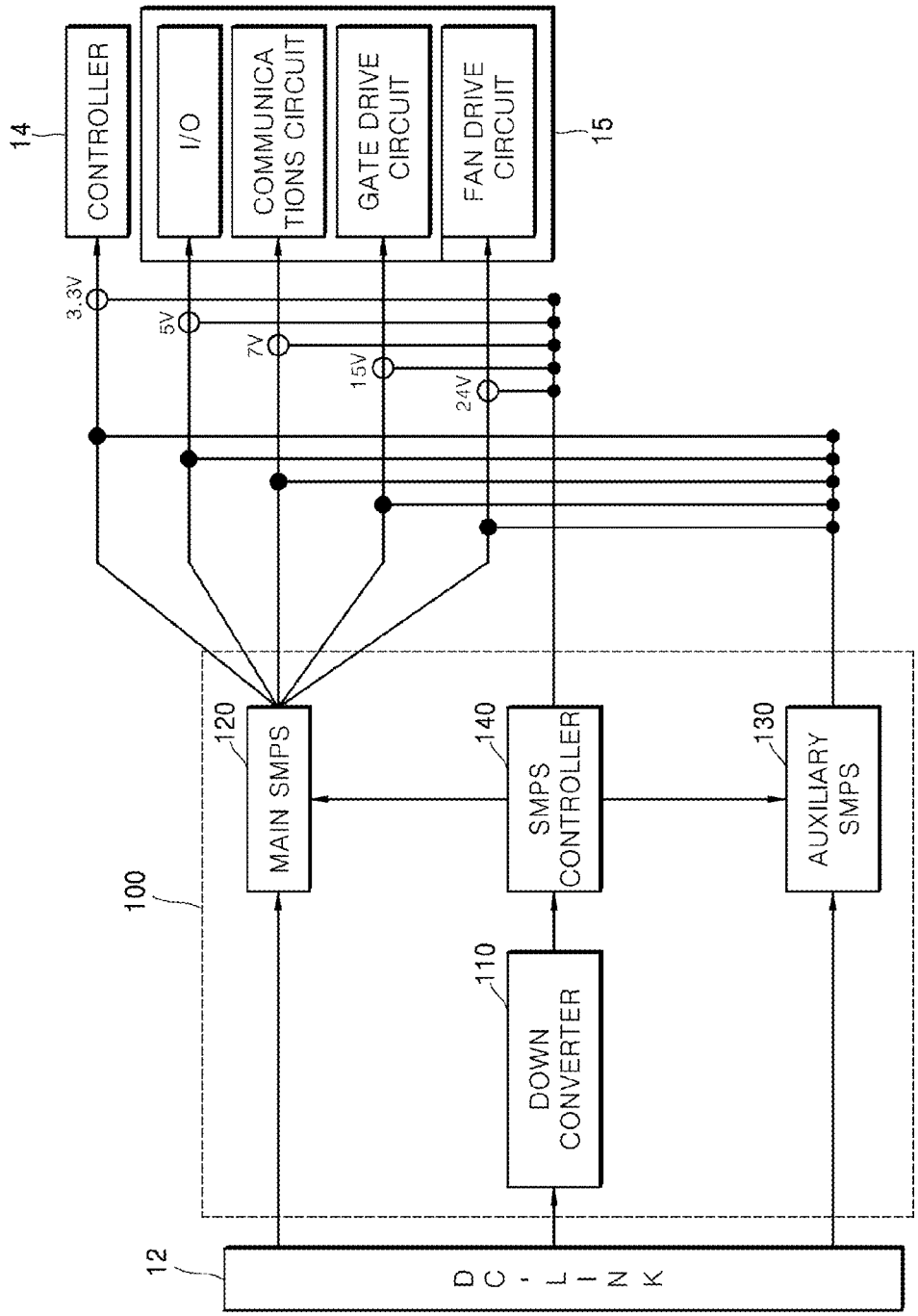
FIG. 2 is a diagram illustrating a configuration of the control power supply device according to an embodiment of the present disclosure.

FIG. 2 is a diagram illustrating a configuration of the control power supply device according to an embodiment of the present disclosure.

Referring to FIG. 2, the control power supply device 100 according to the embodiment of the present disclosure supplies stable voltages to the controller 14 and the auxiliary circuit 15 included in the inverter 10. The control power supply device 100 may include a down converter 110, a main SMPS 120, an auxiliary SMPS 130, and an SMPS controller 140.

The down converter 110 steps down a voltage of the DC-link 12 to output it to the main SMPS 120 and the auxiliary SMPS 130. The down converter 110 may be a buck converter.

The main SMPS 120 and the auxiliary SMPS 130 are supplied with an operating voltage through the DC-link 12. Each of the main SMPS 120 and the auxiliary SMPS 130 includes a switching circuit. For example, each of the main SMPS 120 and the auxiliary SMPS 130 may include a MOSFET as the switching circuit.

The SMPS controller 140 uses the voltage stepped down by the down converter 110 as an operating power.

In an initial operation of the inverter 10, the SMPS controller 140 turns on the MOSFET of the main SMPS 120 and turns off the MOSFET of the auxiliary SMPS 130, such that the main SMPS 120 is operated in a normal operation.

The SMPS controller 140 senses, in real time, a voltage output from the main SMPS 120 during the operation of the main SMPS 120.

The SMPS controller 140 monitors the sensed voltage from the main SMPS 120. When the sensed voltage from the main SMPS 120 is in an abnormal range, the SMPS controller 140 turns off the MOSFET of the main SMPS 120 and turns on the MOSFET of the auxiliary SMPS 130, so that the auxiliary SMPS 130 is operated.

At the moment when the auxiliary SMPS 130 is operated, the SMPS controller 140 stores main SMPS fault history in a memory thereof, and transmits trip information to the controller 14 such that trip history is stored, allowing a user to see the trip history. The trip information indicates that an SMPS fault occurred in the main SMPS 120 and accordingly the auxiliary SMPS 130 has been operated. Upon receiving the trip information from the SMPS controller 140, the controller 14 may provide the trip information to the user.

When the auxiliary SMPS 130 is operated, a normal operation of the inverter 10 can be performed using the auxiliary SMPS 130.

The main SMPS 120 and the auxiliary SMPS 130, according to specifications of the inverter 10, may supply all voltages of 3.3 V, 5 V, 7 V, 15 V, and 24 V, or may selectively supply only a required voltage. For example, the controller 14 may be supplied with the voltage of 3.3 V from the main SMPS 120 and the auxiliary SMPS 130. The auxiliary circuit 15 may be supplied with voltages of 5 V, 7 V, 15 V, and 24 V, which are set to operate an I/O circuit, a communications circuit, a gate drive circuit, and a fan drive circuit, respectively. It will be understood that the main SMPS 120 and the auxiliary SMPS 130 do not necessarily supply voltages of 3.3 V, 5 V, 7 V, 15 V, and 24 V, and may supply voltages including other magnitudes.

The SMPS controller 140 may perform control power supply in various modes according to specifications of the inverter 10.

For example, the SMPS controller 140 may perform a first mode in which trip information is transmitted to the controller 14 and the auxiliary SMPS 130 supplies a voltage only to the controller 14.

For example, the SMPS controller 140 may perform a second mode in which trip information is transmitted to the controller 14 and the auxiliary SMPS 130 supplies, to the controller 14 and the auxiliary circuit 15, a minimum power including a gate drive power for restarting the inverter 10 and an I/O power.

For example, the SMPS controller 140 may perform a third mode in which trip information is transmitted to the controller 14 and the auxiliary SMPS 130 supplies, to the controller 14 and the auxiliary circuit 15, a maximum power including a power including a gate drive power for restarting the inverter 10 and an I/O voltage, and power for communications and fan control.

For example, a compact inverter has limited space and cost. Therefore, the first mode may be performed such that the auxiliary SMPS 130 supplies power only to the controller 14 and only trip information is transmitted to the controller 14, allowing a user to see trip history.

For example, in a standard-grade inverter, the second mode may be performed such that the auxiliary SMPS 130 supplies, to the controller 14 and the auxiliary circuit 15, only the minimum power including power for the controller 14, an I/O power, and a gate drive power, allowing a user to see trip history and restart the inverter.

For example, in a premium grade inverter that requires high reliability, the third mode may be performed such that the auxiliary SMPS 130 supplies all voltages to the controller 14 and the auxiliary circuit 15, allowing a user to see trip history, restart the inverter, as well as auxiliary operations including communications and fan driving.

Figure 3:
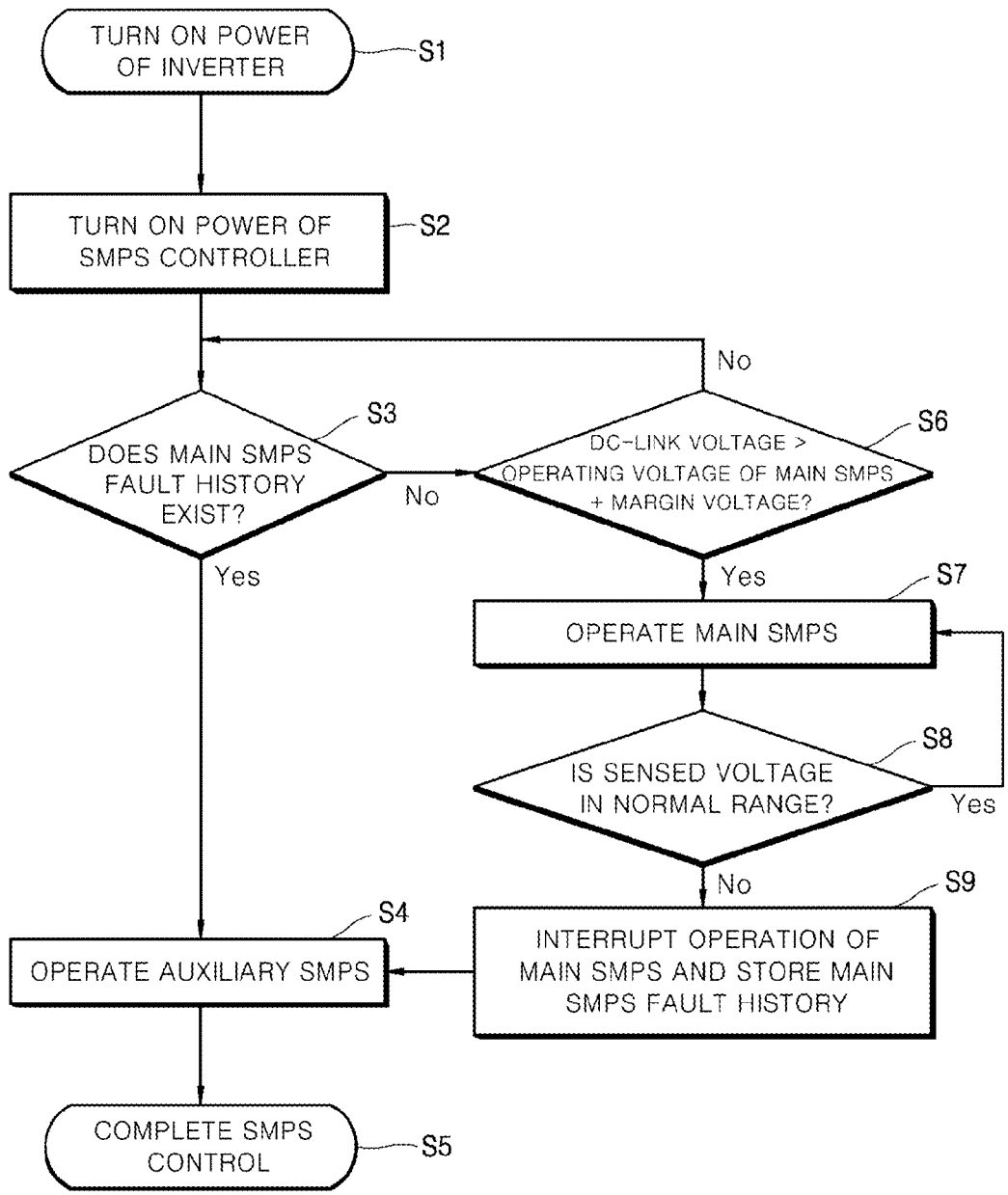
FIG. 3 is a flowchart illustrating a power supply control method in the control power supply device according to an embodiment of the present disclosure.

FIG. 3 is a flowchart illustrating a power supply control method in the control power supply device according to an embodiment of the present disclosure.

Referring to FIG. 3, upon being powered, the inverter 10 enters the on-state (S1). As the inverter 10 is powered, the SMPS controller 140 is supplied with the power from the DC-link 12 of the inverter 10, to enter the on state (S2). The SMPS controller 140 searches for the memory therein and determines whether main SMPS fault history is stored in the memory (S3). To this end, the SMPS controller 140 stores the main SMPS fault history in the memory. When the operation of the main SMPS 120 is interrupted and the auxiliary SMPS 130 is operated as a fault occurs in the main SMPS 120, the main SMPS fault history may be created by the SMPS controller 140 to be stored in the memory. The main SMPS fault history stored in the memory may be deleted by the SMPS controller 140 when the operation of the main SMPS 120 is returned to a normal operation through repair or replacement of the main SMPS 120. The determination as to whether the operation of the main SMPS 120 has been returned to the normal operation and the deletion of the main SMPS fault history may be performed by the SMPS controller 140 through a system operator's manipulation. However, the present disclosure is not limited thereto. Alternatively, the SMPS controller 140 may periodically determine whether the operation of the main SMPS 120 has been returned to the normal operation, and delete the main SMPS fault history from the memory when it is determined that the operation of the main SMPS 120 has been returned to the normal operation.

If it is determined in step S3 that there is a main SMPS fault history, the SMPS controller 140 determines that a problem has occurred in the main SMPS 120, and turns of the auxiliary SMPS 130 (S4). To this end, the SMPS controller 140 turns on the MOSFET of the auxiliary SMPS 130. Accordingly, SMPS control is completed (S5).

If it is determined in step S3 that there is no main SMPS fault history, the SMPS controller 140 compares a DC-link voltage with an operating voltage of the main SMPS 120 plus a margin voltage, thereby determining which one is larger. The margin voltage refers to an allowable error in voltage from the normal range, which is smaller or greater than the operating voltage set based on specifications of the main SMPS 120. For example, the margin voltage may be +10 V.

If it is determined in step S6 that the DC-link voltage is greater than the operating voltage of the main SMPS 120 plus 10 V, the SMPS controller 140 recognizes that information on an output voltage sensed from the main SMPS 120 is valid information, and allows the main SMPS 120 to be operated (S7). To this end, the SMPS controller 140 turns on the MOSFET of the main SMPS 120. In this regard, a voltage margin for determining the validity of the output voltage sensed from the main SMPS 120 by the SMPS controller 140 is set to 10 V.

The margin of 10 V is considered because power is not yet supplied to the main SMPS 120 at the moment when the power is supplied to the inverter 10.

Without considering such margin, it may be erroneously determined that there is an SMPS error in the main SMPS 120 because the main SMPS 120 is not operated and the sensed information from main SMPS 120 is out of the normal range.

Even when the power of the inverter 10 is turned off, the SMPS controller 140 compares the DC-link voltage with the operating voltage of the main SMPS 120 plus 10 V, thereby determining that the sensed information of the main SMPS 120 is not valid after the power of the main SMPS 120 is completely turned off, which is safe.

If the operation of the main SMPS 120 enters the on state, the SMPS controller 140 senses an output voltage from the main SMPS 120, thereby determining whether the sensed voltage is in a preset normal range (S8).

If it is determined that the sensed voltage is within the normal range, the main SMPS 120 continuously remains in the on state. On the other hand, if it is determined that the sensed voltage is not in the normal range, the operation of the SMPS 120 is interrupted, and a main SMPS fault history is stored in the memory (S9). Then, the auxiliary SMPS 130 is operated (S4), thereby completing the SMPS control (S5).

For standard and premium grade products, reliability is more important than size and price. In the case that an inverter used in a crane, a production line, etc., is interrupted due to the failure that an SMPS is not working, this may result in a great amount of monetary loss and even casualties. Therefore, high reliability is economical in terms of cost.

According to the present disclosure, trip information is provided to a user, so that the user can accurately grasp the situation.

Also, according to the present disclosure, power required in operations of the auxiliary SMPS is supplied by performing various operating modes, so that the transmission of trip information and the operation of the inverter can be continuously performed. Thus, it is possible to reduce user's risk and to promote user's convenience. Furthermore, it is possible to provide high reliability.

While the present disclosure has been described in connection with the preferred embodiments, it will be understood by those skilled in the art that various modifications and changes can be made thereto without departing from the spirit and scope of the disclosure defined by the appended claims.

What is claimed is:

1. A control power supply device for an inverter, which supplies stable power to the inverter, the control power supply device comprising:
   a main switched-mode power supply (SMPS) configured to supply rated voltages to a controller and an auxiliary circuit of the inverter;
   an auxiliary SMPS configured to be operated when the main SMPS is interrupted to supply the rated voltages to the controller and the auxiliary circuit of the inverter ; and
   an SMPS controller configured to sense an output voltage from the main SMPS, determine whether the sensed voltage is within a normal range and interrupt the main SMPS and operate the auxiliary SMPS if not, and transmit trip information to the controller,
   wherein the SMPS controller senses an output voltage from the main SMPS when a DC-link voltage of the inverter is greater than a set voltage at the time of turning on or off the inverter, and determines whether the sensed voltage is in the normal range.

2. The control power supply device according to claim 1, wherein the SMPS controller stores a main SMPS fault history in a memory when the sensed voltage is not within the normal range.

3. The control power supply device according to claim 2, wherein the SMPS controller, upon being powered, determines whether there is a main SMPS fault history stored in the memory, interrupts the main SMPS and operates the auxiliary SMPS if so, and transmits the tip information to the controller.

4. The control power supply device according to claim 1, wherein the set voltage level is an operating voltage of the main SMPS plus a margin voltage.

5. The control power supply device according to claim 1, further comprising a down converter configured to step down a voltage from a DC-link of the inverter and output it to the SMPS controller.

6. The control power supply device according to claim 1, wherein the main SMPS and the auxiliary SMPS are supplied with an operating voltage from the DC-link of the inverter.

7. The control power supply device according to claim 1, wherein the controller indicates the trip information received from the SMPS controller to a user.

8. The control power supply device according to claim 1, wherein a first mode is performed in which the SMPS controller transmits the trip information to the controller and the auxiliary SMPS supplies a voltage only to the controller.

9. The control power supply device according to claim 1 wherein a second mode is performed in which the SMPS controller transmits the trip information to the controller and the auxiliary SMPS supplies the controller and the auxiliary circuit with a minimum power including a gate drive power for restarting the inverter and an I/O power.

10. The control power supply device according to claim 1, wherein a third mode is performed in which the SMPS controller transmits the trip information to the controller and the auxiliary SMPS supplies the controller and the auxiliary circuit with a maximum voltage including a gate drive power for restarting the inverter and an I/O power, and power for communications and fan control.

* * * * *